United States Patent
Sato (10) Patent No.: US 8,073,313 B2
(45) Date of Patent: Dec. 6, 2011

(54) MOVING PICTURE DATA PROCESSING APPARATUS, STREAM GENERATING APPARATUS, IMAGING APPARATUS, AND MOVING PICTURE DATA PROCESSING METHOD

(75) Inventor: Takayuki Sato, Kanagawa (JP)

(73) Assignee: Sony Corporation (JP)

( * ) Notice: Subject to any disclaimer, the term of this patent is extended or adjusted under 35 U.S.C. 154(b) by 1245 days.

(21) Appl. No.: 11/801,141

(22) Filed: May 9, 2007

(65) Prior Publication Data

US 2007/0269182 A1    Nov. 22, 2007

(30) Foreign Application Priority Data

May 17, 2006   (JP) .............................. P2006-137889

(51) Int. Cl.
*H04N 5/76*   (2006.01)
*H04N 5/935*   (2006.01)
*H04N 5/765*   (2006.01)

(52) U.S. Cl. ........ 386/291; 386/210; 386/211; 386/217; 386/219; 386/222; 386/201; 386/232; 386/220

(58) Field of Classification Search .................. 386/326, 386/291, 232, 222, 201, 220, 210–211, 217, 386/219
See application file for complete search history.

(56) References Cited

U.S. PATENT DOCUMENTS

| | | | | |
|---|---|---|---|---|
| 4,546,383 | A | * | 10/1985 | Abramatic et al. ......... 348/14.15 |
| 6,871,234 | B1 | * | 3/2005 | Minakuchi et al. ........... 709/231 |
| 7,920,775 | B2 | * | 4/2011 | Tagawa .......................... 386/328 |
| 2006/0140587 | A1 | * | 6/2006 | Aridome et al. ................ 386/95 |

FOREIGN PATENT DOCUMENTS

| | | |
|---|---|---|
| JP | 11074880 A | 3/1999 |
| JP | 2002094939 A | 3/2002 |
| JP | 2004312278 A | 11/2004 |
| JP | 2005-079823 A | 3/2005 |
| JP | 2005136754 A | 5/2005 |
| JP | 2005318502 A | 11/2005 |
| JP | 2007158432 A | 6/2007 |

OTHER PUBLICATIONS

Office Action from Japanese Application No. 2006-137889, dated Dec. 7, 2010.

* cited by examiner

*Primary Examiner* — Helen Shibru
(74) *Attorney, Agent, or Firm* — Lerner, David, Littenberg, Krumholz & Mentlik, LLP (57) ABSTRACT

The present invention provides a moving picture data processing apparatus for outputting moving picture data by adding time information thereto, which includes: a moving picture input section which receives an input of the moving picture data for which a standard screen rate and one or more screen rates are switchable at an arbitrary timing; a time information addition processing section which adds input time information to the moving picture data; a timer section; an input start time acquiring section which acquires an input start time for the moving picture data; an input time information generating section which calculates the input time information by integrating the time information with the input start time; a moving picture playback section which plays back picture frames of the moving picture data at the standard screen rate; and a time information extracting section which extracts the input time information from the moving picture data.

9 Claims, 5 Drawing Sheets

MOVING PICTURE DATA PROCESSING APPARATUS, STREAM GENERATING APPARATUS, IMAGING APPARATUS, AND MOVING PICTURE DATA PROCESSING METHOD

CROSS-REFERENCE TO RELATED APPLICATIONS

The present application claims priority from Japanese Patent Application No. JP 2006-137889, filed in the Japanese Patent Office on May 17, 2006, the entire content of which is incorporated herein by reference.

BACKGROUND OF THE INVENTION

1. Field of the Invention

The present invention relates to a moving picture data processing apparatus, a stream generating apparatus, an imaging apparatus, and a moving picture data processing method for processing moving picture data. Particularly, the invention is directed to a moving picture data processing apparatus, a stream generating apparatus, an imaging apparatus, and a moving picture data processing method, all capable of processing moving picture data for which screen rates are switchable.

2. Description of Related Art

Recently, imaging apparatus (digital video cameras) capable of imaging moving pictures for recording as digital data has become popular rapidly. Some of such imaging apparatus additionally record imaged time information, that is, information of the time when imaging is performed, in a stream into which video data and audio data are multiplexed, and read the information during playback to display the imaged times onscreen. One such example is an apparatus that generates a multiplexed stream into which an additional recording information pack containing imaged time information is multiplexed together with video packs and audio packs (see, e.g., Japanese Patent Application Publication No. 2005-79823 (Paragraphs Nos. [0047]-[0050] and FIG. 8).

Furthermore, the imaged time information to be thus recorded in a multiplexed stream is generated as follows. That is, when recording of an imaged picture on a recording medium has been started, a recording start time is read from a clock built in an imaging apparatus, and then a fixed time corresponding to a cycle for outputting a picture frame is added to the recording start time every time the cycle occurs. According to this method, even if the built-in clock is not accurate enough, correct time information has been recorded in synchronism with the cycle for outputting a picture frame, at the time the multiplexed stream is generated.

Meanwhile, as the performance of an imaging device and the signal processing technology progress, such imaging apparatus as mentioned above come to be able to output an imaged picture at a display cycle shorter than that defined by the current TV broadcasting standard. Hence, an imaging apparatus with such a fast imaging function is being contemplated. For example, an imaging apparatus capable of slow playback is in contemplation, in which video data imaged and recorded at a screen rate several times a standard screen rate are played back and displayed at the standard screen rate.

SUMMARY OF THE INVENTION

By the way, the above-mentioned imaged time information generating method, i.e., the method, by which at the recording start time for a picture, a fixed time is added every time a picture frame is outputted, has been successful in generating correct time information, as long as the screen rate during imaging is fixed. However, in a case where this method is applied to an imaging apparatus capable of slow-motion playback of video data recorded by fast imaging, the imaged times for display gradually get behind during the slow-motion playback, because how the time advances during imaging differs from how the time advances during playback. As a result, there has been a problem that correct times are not displayed.

The present invention has been made, in view of such a problem, to provide a moving picture data processing apparatus and method enabled to correctly acquire imaged times when an input of moving picture data is received and then the moving picture data are played back at a speed different from that during the input.

Furthermore, the present invention also provides a stream generating apparatus enabled to correctly acquire imaged times when an input of moving picture data is received and then the moving picture data are played back at a speed different from that during the input.

Furthermore, the present invention also provides an imaging apparatus enabled to correctly acquire imaged times when moving picture data captured by imaging are played back at a speed different from that during the imaging.

According to an embodiment of the present invention, there is provided a moving picture data processing apparatus for outputting moving picture data by adding time information thereto. The apparatus includes a moving picture input section; a time information addition processing section; a timer section; an input start time acquiring section; an input time information generating section; a moving picture playback section; and a time information extracting section. The moving picture input section receives an input of the moving picture data for which a standard screen rate and one or more screen rates different from the standard screen rate are switchable at an arbitrary timing. The time information addition processing section adds, to the moving picture data inputted to the moving picture input section, input time information which is information about an input time at which a predetermined picture frame of the moving picture data is inputted to the moving picture input section. The timer section counts a time. The input start time acquiring section acquires an input start time for the moving picture data at the moving picture input section, from the timer section. The input time information generating section calculates the input time information by integrating the time information which is compliant with the screen rate of the moving picture data to be inputted to the time information addition processing section and which corresponds to a display interval for the picture frame, with the input start time. The moving picture playback section plays back picture frames of the moving picture data to which the input time information is added, at the standard screen rate. The time information extracting section extracts the input time information from the moving picture data in synchronism with the playback operation by the moving picture playback section.

DESCRIPTION OF THE EMBODIMENTS

An embodiment of the present invention will be described in detail with reference to the drawings.

Figure 1:
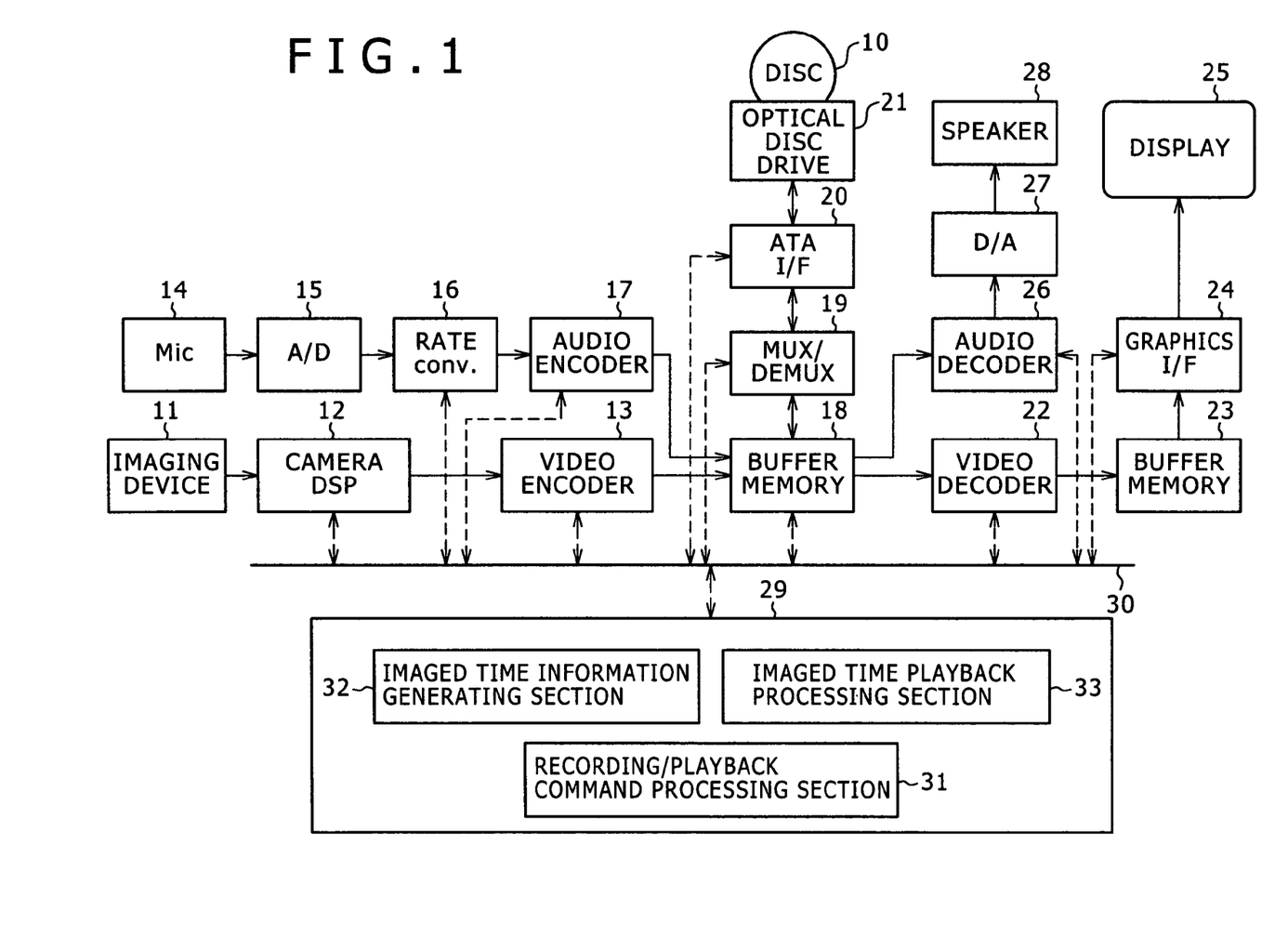
FIG. 1 is a block diagram showing the configuration of an imaging apparatus according to an embodiment of the present invention.

FIG. 1 is a block diagram showing the configuration of an imaging apparatus according to the embodiment of the present invention. The imaging apparatus shown in FIG. 1 is a so-called digital video camera that images moving pictures and records the moving pictures on a recording medium as digital data. Also, this imaging apparatus uses an optical disc 10 such as a DVD (Digital Versatile Disc) as an example of the recording medium on which a data stream containing a video signal is recorded.

This imaging apparatus includes an imaging device 11, a camera DSP (Digital Signal Processor) 12, a video encoder 13, a microphone 14, an audio data A/D (Analog/Digital) converter 15, an audio data sampling rate converter 16, an audio encoder 17, a buffer memory 18, a MUX/DEMUX (Multiplexer/Demultiplexer) 19, an ATA (AT Attachment) interface 20, an optical disc drive 21, a video decoder 22, a video data buffer memory 23, a graphics interface 24, a display 25, an audio decoder 26, a D/A (Digital/Analog) converter 27, a speaker 28, a CPU (Central Processing Unit) 29, and an internal bus 30.

The imaging device 11 is a solid-state imaging device such as a CCD (Charge Coupled Device) or a CMOS (Complementary Metal-Oxide Semiconductor) image sensor, and converts light converged by an optical block, not shown, into an electrical signal.

The camera DSP 12 executes various analog signal processing such as a CDS (Correlated Double Sampling) process and an AGC (Auto Gain Control) process, and various digital signal processing such as A/D conversion and a detection process and a picture quality correction process for imaging operation control, under the control of the CPU 29.

Note that this imaging device 11 is enabled to output an imaged picture signal both at a standard screen rate and at a screen rate faster than that. In the present embodiment, it is configured such that the imaging device 11 has, as an example, two imaging modes: a normal imaging mode for imaging at a screen rate of 30 frames/sec (or 60 fields/sec) and a fast imaging mode for imaging at a rate three times that of the normal imaging mode, namely, a screen rate of 90 frames/sec (or 180 fields/sec), and both imaging modes are to be randomly switchable during imaging/recording. And it is further configured such that the imaging device 11 outputs an imaged picture signal at these two screen rates and the camera DSP 12 can process such picture signals sequentially in synchronism with these two screen rates.

The video encoder 13 encodes video data outputted from the camera DSP 12 according to a predetermined compressing/encoding scheme, under the control of the CPU 29. In the present embodiment, the video encoder 13 performs a compressing/encoding process on the video data according to an MPEG scheme, and supplies the encoded video data to the buffer memory 18 as a video ES (Elementary Stream).

The microphone 14 picks up an audio signal. The A/D converter 15 converts the audio signal picked up by the microphone 14 into digital data. The sampling rate converter 16 converts the sampling rate of the digitized audio data according to a control signal from the CPU 29. Here, the A/D converter 15 converts the audio signal into a digital signal at a fixed sampling rate of 48 kHz. The sampling rate converter 16 operates only when the fast imaging mode is set, and converts the digital audio data from the A/D converter 15 into digital audio data having a ×3 sampling rate (144 kHz).

Note that in this example, it is configured such that the sampling rate converter 16 converts by computation the fixed sampling rate at which the audio data has been digitized by the A/D converter 15. However, instead of providing the sampling rate converter 16, it may alternatively be configured to make the sampling rate during digital conversion by the A/D converter 15 variable so that the CPU 29 can control that sampling rate.

The audio encoder 17 encodes the audio data from the sampling rate converter 16 according to a predetermined compressing/encoding scheme such as, e.g., the MPEG scheme, and supplies the encoded audio data to the buffer memory 18 as an audio ES.

The buffer memory 18 buffers the video ES and the audio ES from the video encoder 13 and the audio encoder 17, respectively, for output to the MUX/DEMUX 19, under the control of the CPU 29. Also, the buffer memory 18 buffers the video ES and the audio ES supplied from the MUX/DEMUX 19, for output to the video decoder 22 and the audio decoder 26, respectively, under the control of the CPU 29.

The MUX/DEMUX 19 reads the video ES, the audio ES, and the like stored in the buffer memory 18 to packetize them into packets, and generates a PS (Program Stream) by multiplexing these packets, for output to the optical disc drive 21 via the ATA interface 20. Note that, as described later, during generation of the PS, imaged time information is generated by the CPU 29, and this information is multiplexed at a predetermined position within the PS. Also, the MUX/DEMUX 19 separates a video ES, an audio ES, and various header information from a PS read from the optical disc 10, loads the respective ES data into the buffer memory 18, and outputs the header information to the CPU 29. At the same time, imaged time information separated from the PS by the MUX/DEMUX 19 is also outputted to the CPU 29.

The ATA interface 20 is an interface circuit for connecting the optical disc drive 21, and controls the recording/playback operation of the optical disc drive 21 according to a control signal from the CPU 29. The optical disc drive 21 writes data to and read the written data from the removable optical disc 10.

The video decoder 22 reads the video ES read from the optical disc 10 and loaded into the buffer memory 18, and decompresses/decodes the video data according to the MPEG scheme, under the control of the CPU 29. The buffer memory 23 buffers the video data outputted from the video decoder 22.

The graphics interface 24 converts the video data from the buffer memory 23 or the video data supplied from the camera DSP 12 via the internal bus 30, into a signal for onscreen display, for supplying to the display 25. Also, the graphics interface 24 synthesizes textual information indicative of imaged times with a picture signal, as controlled by the CPU 29. The display 25 is formed of, e.g., an LCD (Liquid Crystal Display), and displays a picture currently being imaged and a playback of the data recorded on the optical disc 10.

The audio decoder 26 reads the audio ES read from the optical disc 10 and loaded into the buffer memory 18, and decompresses/decodes the audio data under the control of the CPU 29. The D/A converter 27 converts the audio data from the audio decoder 26 into an analog signal, for output to the speaker 28, to play back the audio.

The CPU 29 executes a program stored in a memory, not shown, for total control over this imaging apparatus. The imaging apparatus according to the present embodiment includes, as functions of this CPU 29, a recording/playback command processing section 31 that processes commands for recording video/audio data on the optical disc 10 and playing back the data therefrom, an imaged time information generating section 32 that generates imaged time information during generation of a PS, and an imaged time playback processing section 33 for displaying imaged time information played back from the optical disc 10, onscreen.

Here, the basic operation of recording and playing back the video/audio data in the above-described imaging apparatus will be described. First, when a recording is requested to the CPU 29 in response to a command input given by a user to an input section, not shown, the recording/playback command processing section 31 causes the video encoder 13 and the audio encoder 17 to start their encoding process according to this request. Video data outputted from the camera DSP 12 are sequentially encoded by the video encoder 13 to generate a video ES, and the video ES is loaded into the buffer memory 18. Likewise, audio data outputted from the A/D converter 15 are supplied to the audio encoder 17 via the sampling rate converter 16, and sequentially encoded to generate an audio ES, and the audio ES is loaded into the buffer memory 18. Note that at this point of the operation, the video data from the camera DSP 12 are supplied also to the graphics interface 24 via the internal bus 30, whereby a picture currently being imaged is displayed on the display 25.

The MUX/DEMUX 19 packetizes the video ES and the audio ES read from the buffer memory 18, respectively, under the control of the recording/playback command processing section 31, and further generates a pack from a plurality of packets, for multiplexing as a PS. At this point of the operation, the imaged time information generating section 32 sequentially generates imaged time information, for supply to the MUX/DEMUX 19, and this imaged time information is multiplexed at a predetermined position (a later-described additional recording information pack) within the PS. The thus generated PS is recorded on the optical disc 10 according to a predetermined file format.

Furthermore, if a playback is requested to the CPU 29 in response to a command input given by the user, the recording/playback command processing section 31 controls the ATA interface 20 to cause the optical disc drive 21 to read a data stream on the optical disc 10 and supply the read data stream to the MUX/DEMUX 19. The MUX/DEMUX 19 extracts a PS from the input data, separates a video ES and an audio ES from the PS, for supply to the buffer memory 18, and also outputs the information and the like extracted from the header, to the CPU 29. At this point of the operation, the MUX/DEMUX 19 outputs the imaged time information extracted from the additional recording information pack, to the imaged time playback processing section 33.

The video ES and the audio ES stored in the buffer memory 18 are supplied to the video decoder 22 and the audio decoder 26, respectively, for decoding. As a result, the picture played back is displayed on the display 25 and the audio is also played back via the speaker 28. Furthermore, the imaged time playback processing section 33 supplies the textual information indicative of the imaged times and the like, to the graphics interface 24, on the basis of the imaged time information received from the MUX/DEMUX 19. As a result, the text indicative of the imaged times and the like are displayed by synthesis upon the picture being played back.

Figure 2:
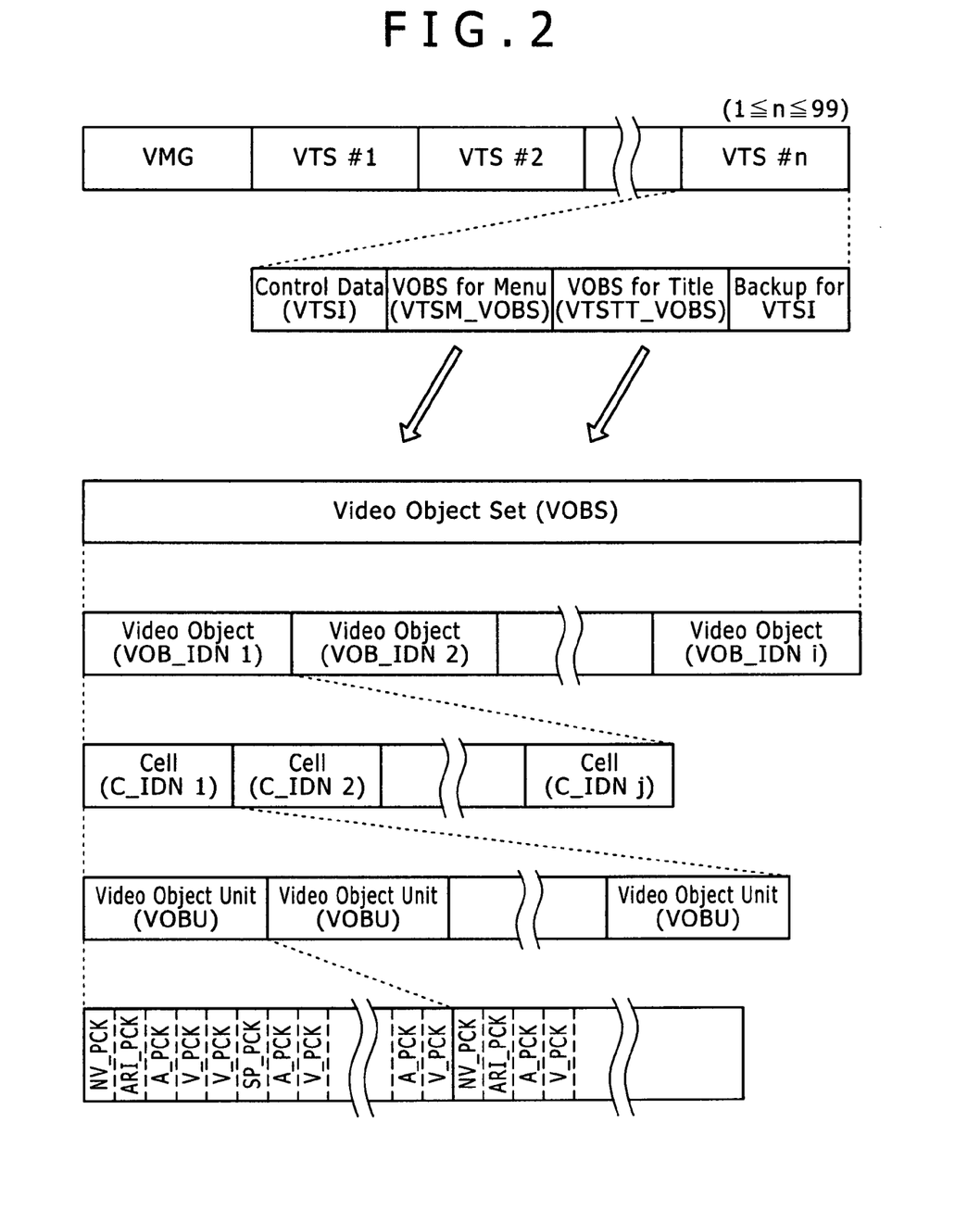
FIG. 2 is a diagram for explaining a data format of a DVD-VIDEO standard.

Here, considering the optical disc 10 to be a DVD compliant with the DVD-VIDEO standard, the location at which to load the imaged time information in its data format will be described. FIG. 2 is a diagram for explaining the data format of the DVD-VIDEO standard.

In the optical disc 10 compliant with the DVD-VIDEO standard, a volume structure is defined which includes a single video manager (VMG, or Video Manager) and 1 or more and 99 or less video title sets (VTS, or Video Title Set). The VMG is located at the beginning of a DVD-VIDEO zone, and includes a VTS managing file and the like.

A VTS includes 3 or more but 12 or less files. A control data (VTSI, or Video Title Set Information) file comes first, which is then followed by a VOBS (VTSM_VOBS, or VTSM Video Object Set) file for a menu. The following 1 to 9 files are VOBS (VTSTT_VOBS, or VTSTT Video Object Set) files for titles. The last file is a VTSI backup file. Note that the VTSI is information for managing a VTS menu (VTSM, or Video Title Set Menu) and one or more titles (TT, or Title) in the VTS.

A VOBS includes one or more video objects (VOB, or Video Object). The ID numbers of VOBs (VOB_IDN, or VOB ID Number) are assigned from a VOB having the smallest logical sector number within the VOBS. A VOB includes one or more cells (Cell), and the ID numbers of cells (C_IDN, or Cell ID Number) are assigned from a cell having the smallest logical sector number within the VOB.

Furthermore, a cell includes an integer number of video object units (VOBU, or Video Object Unit). A VOBU is a string of packs starting with a navigation pack (NV_PCK, or Navigation Pack). A pack is data having a fixed length of 2048 bytes. The VOBU includes, starting with the navigation pack, audio packs (A_PCK, or Audio Pack), video packs (V_PCK, or Video Pack), and sub-picture packs (SP_PCK, or Sub-picture Pack), as necessary. Furthermore, in the present embodiment, an additional recording information pack containing additional recording information (ARI_PCK) is provided in the VOBU, whereby the imaged time information is recorded in this additional recording information pack. Note that the additional recording information pack is arranged at intervals of 0.5 second.

By the way, this imaging apparatus has, in addition to a function of imaging pictures at the standard screen rate, a function of imaging pictures at a screen rate faster than that and recording the imaged picture data on the optical disc 10. Specifically, as described above, the apparatus includes the normal imaging mode for imaging at a normal screen rate and the fast imaging mode for imaging at a screen rate three times the normal screen rate.

Furthermore, data about a picture imaged in the fast imaging mode are generated as a video ES having the standard screen rate which is the same as the screen rate of the normal imaging mode, for recording on the optical disc 10. Such a video ES can be realized, e.g., by always adding playback time management information (PTS, or Presentation Time Stamp) having a fixed interval, per picture frame, irrespective of the imaging mode. And by playing back the picture data recorded on the optical disc 10 at the standard screen rate as usual, the picture imaged at the fast imaging mode can be displayed at a speed ⅓ the speed at which it was imaged.

Furthermore, in this imaging apparatus, audio data are digitized by the A/D converter 15 at a sampling rate of 48 kHz in the normal imaging mode. Meanwhile, in the fast imaging mode, audio data digitized at a sampling rate of 48 kHz are converted into digital data whose sampling rate is three times as large as that, namely, 144 kHz. As a result, when audio recorded at the fast imaging mode is played back at the speed of the normal imaging mode, the audio data are played back as audio data digitized at 48 kHz which is the same sampling rate as that in the normal imaging mode. Hence, the usual process by the audio decoder 26 can play back the audio that is synchronized with the picture under slow-motion playback.

Here, where it is enabled to play back video data recorded in the fast imaging mode, at the same screen rate as that of the normal imaging mode for slow-motion playback of the picture, how to generate the imaged time information during recording in the normal imaging mode must be differed from how to generate the imaged time information during recording in the fast imaging mode. This is because, in the fast imaging mode, how the time advances during imaging does not coincide with how the time advances during playback.

Figure 3:
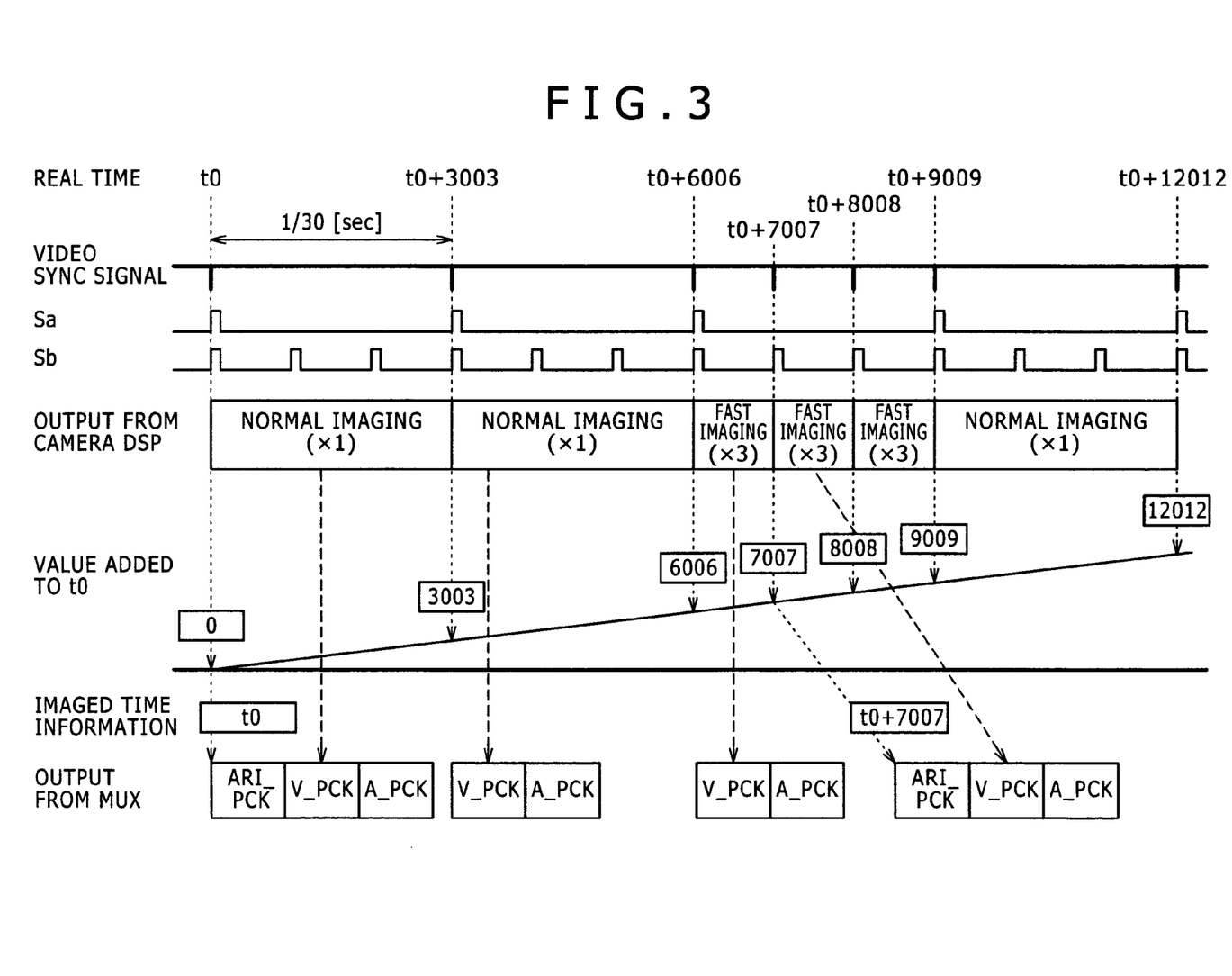
FIG. 3 is a time chart for explaining the operation of the imaging apparatus during recording of video data.

FIG. 3 is a time chart for explaining the operation of the imaging apparatus during recording of video data. In FIG. 3, a real time (actual time) is represented by a value counted at the frequency (90 kHz) of an STC (System Time Clock) being a time management reference clock for a decoding time/presentation time defined in the MPEG scheme. And in an example of FIG. 3, a recording of an imaged picture is started at a time "t0", and the recording continues in the normal imaging mode from the time "t0" to a time "t0+6006". Furthermore, the imaging mode is switched to the fast imaging mode at the time "t0+6006" for imaging at the ×3 screen rate, and then the imaging mode is again switched at a time "t0+9009" to the normal imaging mode, to continue the recording.

The imaged time information has so far been generated by integrating a fixed value with a recording start time, that is, a time read from the built-in clock at the start of a recording, every time a frame is outputted. Such a generation method has provided an advantage that the process of generating imaged time information and multiplexing the generated information into a PS can be easily realized by an independent synchronization control.

For example, in the above-described imaging apparatus, a picture signal captured by the imaging device 11 is appropriately buffered for processing, e.g., during encoding by the video encoder 13, or during multiplexing by the MUX/DEMUX 19. Thus, the picture capturing process by the imaging device 11, the encoding process, and the multiplexing process can be controlled more easily when they are executed as independent tasks under individual synchronization controls. In addition, the load of the CPU 29 can also be scattered.

Here, the generation of the imaged time information is executed during the multiplexing process by the MUX/DEMUX 19 (or may otherwise be executed at the start of the encoding process or at the time of output of the encoded data, by the video encoder 13). Hence, as to data of a certain frame, its processing timing gets behind the picture capturing timing by the imaging device 11. To overcome this situation, by capturing time information counted by the built-in clock only at the start of a recording (i.e., at the picture capturing timing by the imaging device 11), and then by executing the subsequent time adding process in synchronism with the multiplexing timing, correct imaged time information can be generated easily without synchronization with a processing timing at any of other processing blocks including the imaging device 11.

Note that a method may also be considered by which a counted value by the built-in clock is read every time a timing for generating imaged time information arrives. However, in view of the fact that the processing timings differ between the processing blocks as described above, the imaged time information generated by such a method would not be correct. In other words, it would be difficult to implement the built-in clock having accuracy that can be shared among the respective blocks within the imaging apparatus.

However, in the method by which a fixed value is integrated per output of a frame at the time of multiplexing, if how the time advances during imaging differs from how the time advances during playback, imaged times to be recorded get out of synchronism with each other, and hence correct imaged time information has not been recorded. For example, in FIG. 3, after the recording has been started at the time "t0", fixed values "3003" are integrated with the time "t0" one after another, whereby correct imaged time information can be generated, as long as the imaging is performed in the normal imaging mode. However, after the imaging mode has been switched to the fast imaging mode, if the fixed values "3003" are similarly added, when the recorded data are played back at a speed three times faster, the imaged times for display also advance at the speed three times faster. To overcome this situation, in the present embodiment, as shown in FIG. 3, after the imaging mode has been switched to the fast imaging mode, it is configured such that the value to be added to the imaged time information so far used is reduced to ⅓ that in the normal imaging mode (i.e., "1001") so that correct imaged time information can be generated.

Note that in FIG. 3, in the row captioned "OUTPUT FROM MUX", video packs (V_PCK) and audio packs (A_PCK) into which a video signal and an audio signal are loaded, respectively, are indicated in the order of frames arranged at the time of imaging. However, it is merely so indicated in FIG. 3 for simplicity. Actually, as to the video data, where bi-directional predictive coding for forward and backward picture data is performed, such order does not apply when the video data are multiplexed. For example, as to a video ES outputted from the video encoder 13, data of the respective frames (picture) are sorted as decoded. Likewise, output timings for the video packs corresponding to the respective frames at the MUX/DEMUX 19 should not always be as indicated in FIG. 3.

As to imaged time information to be recorded into an additional recording information pack, even where, e.g., data of the corresponding frames are multiplexed at different timings due to the as-decoded sorting, those data may be multiplexed into the PS in order of their generation, without particularly rearranging them. In this case, by presenting the imaged time information in the order of their separation from the PS, irrespective of the rearrangement of the corresponding frames, the picture played back can be matched with the imaged times synthesized therewith.

Note that timing signals Sa and Sb in FIG. 3 represent frame processing timings in the normal imaging mode and in the fast imaging mode, respectively. These timing signals Sa and Sb are generated by the CPU 29, and can be used commonly with, e.g., a signal for generating a vertical sync signal (V_sync) that gives a synchronization timing to the imaging device 11 and the like in either of the imaging modes.

Figure 4:
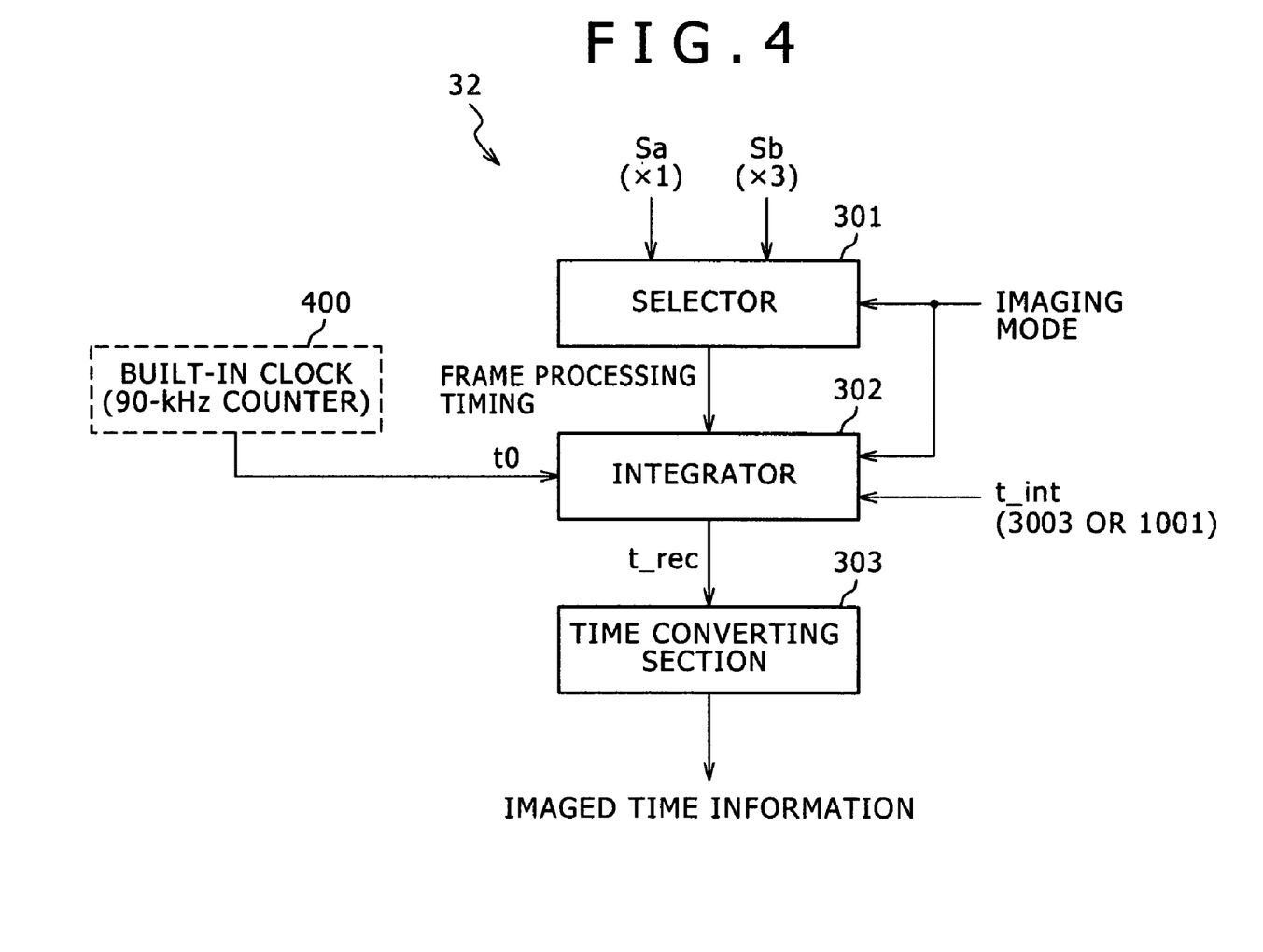
FIG. 4 is a block diagram showing a functional configuration example of an imaged time information generating section.

Next, the configuration of the imaged time information generating section 32 will be specifically described. FIG. 4 is a block diagram showing a functional configuration example of the imaged time information generating section. The imaged time information generating section 32 shown in FIG. 4 includes a selector 301, an integrator 302, and a time converting section 303. Furthermore, a built-in clock 400 is a counter used commonly with the other processing blocks, and is implemented by processing of the CPU 29. This built-in clock 400 counts a 90-kHz clock, and has so many bits as to count such a long period of time as one year, for example.

The selector 301 receives an input of the timing signal Sa or Sb that gives a frame processing timing either in the normal imaging mode or in the fast imaging mode. As mentioned above, the timing signals Sa and Sb can use, e.g., a signal which the CPU 29 outputs to generate a vertical sync signal to the imaging device 11 and the like, and the timing signal Sb has a cycle ⅓ that of the timing signal Sa.

The selector 301 captures an imaging mode managed at the recording/playback command processing section 31 in accordance with a user command, and selects an input of the timing signal Sa when the current imaging mode is the normal imaging mode, and selects the timing signal Sb when the current imaging mode is the fast imaging mode. As a result of such a selection operation, the selector 301 performs the function of generating frame processing timings in the respective imaging modes. That is, from a timing signal from the selector 301, a timing is generated, which is independent of the other processing blocks and at which video frame-based data is multiplexed at the MUX/DEMUX 19.

The integrator 302 integrates an integrated value t_int with the time t0 captured from the built-in clock 400 at the time of an input of a timing signal selected by the selector 301. Here, which integrated value t_int should be selected at the integrator 302 is judged according to the imaging mode.

The time converting section 303 converts an imaged time t_rec generated as a 90-kHz counted value by the integrator 302 into a unit of month/day/hour/minute/second. As a result, imaged time information to be recorded into an additional recording information pack is generated. Note that the imaged time information is generated for each output of a frame. However, since the additional recording information pack is recorded every 0.5 second, the imaged times from the time converting section 303 are outputted to the MUX/DEMUX 19 actually on an appropriately reduced basis.

Figure 5:
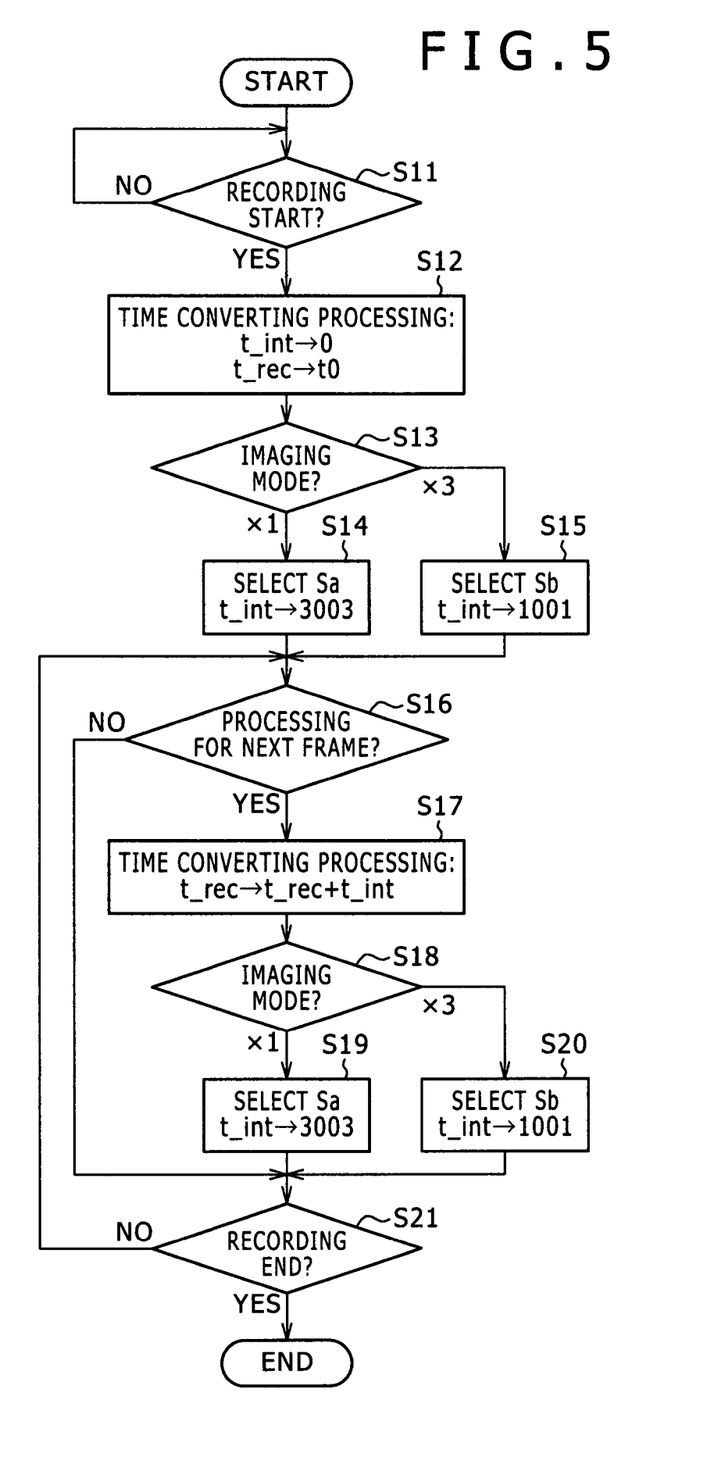
FIG. 5 is a flowchart showing the flow of an imaged time information generating process.

FIG. 5 is a flowchart showing the flow of an imaged time information generating process. First, when the recording/playback command processing section 31 judges, on the basis of a command input from the user via the input section, not shown, that a recording start has been requested (step S11), the integrator 302 of the imaged time information generating section 32 sets the integrated value t_int to "0", reads the time t0 from the built-in clock 400, to output the time t0 as the imaged time t_rec. The time converting section 303 converts the outputted time t0, for output to the MUX/DEMUX 19, thereby imaged time information at the beginning of the recording is loaded into the additional recording information pack (step S12). Here, since the recording start time t0 is read as a timing at which the recording start command from the user has been detected, a correct imaging start time can be detected.

Next, the selector 301 and the integrator 302 determine the currently set imaging mode on the basis of information from the recording/playback command processing section 31 (step S13). Here, if the current imaging mode is the normal imaging mode, the selector 301 selects the timing signal Sa, and the integrator 302 sets "3003" as the integrated value t_int (step S14). Meanwhile, in the fast imaging mode, the selector 301 selects the timing signal Sb, and the integrator 302 sets "1001" as the integrated value t_int (step S15).

Next, the integrator 302 judges a timing for processing a next frame according to whether or not an input of a timing signal from the selector 301 is present (step S16). Here, if the current imaging mode is the normal imaging mode, the frame processing timing is determined on the basis of the timing signal Sa, and if the current imaging mode is the fast imaging mode, the frame processing timing is determined on the basis of the timing signal Sb.

Here, in a case where a frame processing timing is not arrived yet in step S16, if an end of the recording has been determined by the recording/playback command processing section 31 (step S21), the imaged time information generating process is brought to an end, and if not so determined (step S21), the process returns to step S16 to monitor a next frame processing timing.

Meanwhile, if it is determined in step S16 that a frame processing timing has arrived, the integrator 302 adds the integrated value t_int to the last imaged time t_rec to output a new imaged time t_rec, and the time converting section 303 converts the outputted imaged time t_rec (step S17). As a result, imaged time information is generated.

After the imaged time information has been generated, the selector 301 and the integrator 302 determine the current imaging mode again. If the current imaging mode is the normal imaging mode, the selector 301 selects the timing signal Sa, and the integrator 302 sets "3003" as the integrated value t_int (step S19). Meanwhile, if the current imaging mode is the fast imaging mode, the selector 301 selects the timing signal Sb, and the integrator 302 sets "1001" as the integrated value t_int (step S20). Thereafter, if the end of the recording has been determined by the recording/playback command processing section 31 (step S21), the imaged time information generating process is also terminated, and if not (step S21), the process returns to step S16 to monitor a next frame processing timing.

Here, in steps S17 to S20, when a frame processing timing has come, imaged time information is calculated, after which the imaging mode in which the outputted frame has been imaged is determined, and then an integrated value t_int compliant with that imaging mode is set. As a result, the timing for switching the integrated value t_int is delayed upon switching of the imaging mode. For example, integrated values t_int upon switching of the imaging mode, such as at the times "t0+6006" and "t0+9009" in FIG. 3, can be set correctly, thereby correct imaged time information can be generated.

As a result of the above process, times at which a picture is imaged can be generated correctly at all times, which hence permits recording of such times on the optical disc 10 by multiplexing into a PS. Therefore, in a case where video data imaged under the fast imaging mode are played back at the screen rate of the normal imaging mode, the imaged times for display change at a speed ⅓ that of the fast imaging mode, thereby actual imaged times can be displayed correctly.

Furthermore, the time t0 from the built-in clock 400 is read only at the start of a recording, and thereafter, the integration is performed with the time t0 on the basis of a timing signal from the selector 301 which is synchronized with the processing timing at the MUX/DEMUX 19, to generate imaged time information. Hence, correct imaged time information can be generated without synchronization with the other processing blocks, such as the picture capturing process by the imaging device 11 and the encoding process, and under independent timing control. Thus, control becomes easy and the processing load of the CPU 29 can be scattered, which in turn provides an advantage that the manufacturing cost of the CPU 29 is reduced and that the development cost of a control program is also reduced.

Note that in the embodiment described above, only one type of imaging cycle, which is three times the imaging cycle of the normal imaging mode, is available in the fast imaging mode. However, e.g., in the fast imaging mode, it may alternatively be configured to change the imaging speed in a plurality of steps. In this case, e.g., the timing signal Sb for the fast imaging mode shown in FIGS. 3 to 5 may be inputted in a plurality of numbers according to the imaging speed. Still alternatively, the imaging speed may be made randomly adjustable. In this case, e.g., it may be configured to change the cycle of a single type of timing signal Sa according to the imaging speed.

Furthermore, the present invention may be applicable to an imaging apparatus which is provided with, instead of the fast imaging mode, a slow imaging mode whose screen rate is lower than that of the normal imaging mode, and which is hence configured to implement fast playback of video data imaged under the slow imaging mode, at the screen rate of the normal imaging mode. For example, given that the screen rate of the slow imaging mode is ⅓ that of the normal imaging mode, in the configuration of FIG. 4, when it is determined in steps S13 and S18 of FIG. 5 that the current imaging mode is the slow imaging mode, the integrated value t_int is set to "9009", being a value three times that in the normal imaging mode, thereby correct imaged time information can be generated.

Furthermore, in the above-described embodiment, the example in which pictures imaged and audio picked up are recorded on a recording medium has been presented. The present invention may also be applicable to equipment that encodes such picture and audio signals to generate a data stream for delivery to external equipment via a network. Furthermore, the pictures and audio for encoding are not limited to those imaged and picked up, but may also include, e.g., broadcasting content signals received by a TV tuner, or signals inputted via digital or analog video and audio input terminals. That is, the present invention may be applicable to an apparatus that, in response to a picture signal (and an audio signal synchronizing therewith) for which a plurality of screen rates are switchable, encodes these signals to generate a data stream.

Furthermore, the present invention may also be applicable to an apparatus that, in response to a picture signal (and an audio signal synchronizing therewith) for which a plurality of screen rates are switchable, displays the picture and outputs the audio based on these signals, respectively. For example, the present invention may further be applicable to a display apparatus with a special playback function that is configured to display an inputted picture always at the normal screen rate, irrespective of whether the inputted picture data are compliant with the normal screen rate or the fast screen rate, thereby the picture inputted at the fast screen rate is played back for display automatically at a speed lower than the fast screen rate.

According to the moving picture data processing apparatus of the embodiment of the present invention, the time information which is compliant with the screen rate of the moving picture data to be inputted to the time information addition processing section and which corresponds to the display interval for a picture frame, is integrated with the input start time for the moving picture data acquired from the timer section, to calculate the input time information. Hence, correct input time information can be generated and added to the moving picture data at all times, irrespective of the screen rate of the moving picture data inputted, and without synchronization with the moving picture input section. Therefore, even when moving picture data inputted at a screen rate different from the standard screen rate are played back at the standard screen rate by the moving picture playback section, correct input times at the moving picture input section can be acquired from the input time information extracted so as to correspond to the picture being played back. Consequently, correct input times can be displayed, e.g., by using that input time information.

It should be understood by those skilled in the art that various modifications, combinations, sub-combinations and alterations may occur depending on design requirements and other factors insofar as they are within the scope of the appended claims or the equivalents thereof.

What is claimed is:

1. A moving picture data processing apparatus for outputting moving picture data, comprising:
   a moving picture input section which receives an input of the moving picture data for which a standard screen rate and one or more screen rates different from the standard screen rate are switchable at an arbitrary timing;
   a time information addition processing section which adds, to the moving picture data inputted to the moving picture input section, input time information which is information about an input time at which a predetermined picture frame of the moving picture data is inputted to the moving picture input section;
   a timer section which counts a time;
   an input start time acquiring section which acquires an input start time for the moving picture data at the moving picture input section, from the timer section;
   an input time information generating section which calculates the input time information by integrating the time information which is compliant with the screen rate of the moving picture data to be inputted to the time information addition processing section and which corresponds to a display interval for the picture frame, with the input start time;
   a moving picture playback section which plays back picture frames of the moving picture data to which the input time information is added, at the standard screen rate;
   a time information extracting section which extracts the input time information from the moving picture data in synchronism with the playback operation by the moving picture playback section; and
   a moving picture recording section which records the moving picture data to which the input time information is added on a recording medium,
   in which the input time information generating section includes (i) an integrator configured to receive a timing signal associated with a current respective screen rate which indicates a data processing timing for the respective picture frames and, to utilize the timing signal, to integrate a specific integrated value for the current respective screen rate with regard to the input start time at the data processing timing to obtain an integrated value, and (ii) a converting section configured to convert the integrated value to the input time information expressed in a predetermined time unit, and
   in which during operation the moving picture recording section records the moving picture data with the input time information in the predetermined time unit on the recording medium.

2. The moving picture data processing apparatus according to claim 1, wherein:
   the input time information generating section sets, in a case where the screen rate of the moving picture data corresponding to the input time information is changed immediately after the input time information is calculated, the specific integrated value compliant with the changed screen rate.

3. The moving picture data processing apparatus according to claim 1, wherein:
   the input time information generating section selects, in a case where the screen rate of the moving picture data corresponding to the input time information is changed immediately after the input time information is calculated, the timing signal compliant with the changed screen rate, and detects the data processing timing on the basis of the selected timing signal.

4. The moving picture data processing apparatus according to claim 1, wherein:
the moving picture playback section reads the moving picture data from the recording medium to play back the picture frames at the standard screen rate.

5. The moving picture data processing apparatus according to claim 1, wherein:
the moving picture playback section outputs a synthesized picture signal obtained by synthesizing a time displaying image based on the input time information extracted by the time information extracting section, on a picture being played back.

6. The moving picture data processing apparatus according to claim 1, further comprising:
a moving picture encoding processing section for compressing/encoding the moving picture data inputted to the moving picture input section to generate a moving picture stream, wherein:
the time information addition processing section is configured as a multiplexing processing section for multiplexing the moving picture stream and the input time information about the predetermined picture frame of the moving picture stream, to generate a multiplexed stream.

7. A stream generating apparatus for generating a multiplexed stream containing moving picture data, comprising:
a moving picture encoding processing section which encodes the moving picture data for which a standard screen rate and one or more screen rates different from the standard screen rate are switchable at an arbitrary timing, to generate a moving picture stream to be played back at the standard, screen rate at all times;
a multiplexing processing section which multiplexes the moving picture stream and input time information which is information about an input time at which a predetermined picture frame of the moving picture stream is inputted to the moving picture encoding processing section, to generate a multiplexed stream;
a timer section which counts a time;
an input start time acquiring section which acquires an input start time for the moving picture stream at the moving picture encoding processing section, from the timer section; and
an input time information generating section which calculates the input time information by integrating time information which is compliant with the screen rate of the moving picture stream to be inputted to the multiplexing processing section and which corresponds to a display interval for the picture frame, with regard to the input start time,
in which the input time information generating section includes (i) an integrator configured to receive a timing signal associated with a current respective screen rate which indicates a data processing timing and, to utilize the timing signal, to integrate a specific integrated value for the current respective screen rate with regard to the input start time at the data processing timing to obtain an integrated value, and (ii) a converting section configured to convert the integrated value to the input time information expressed in a predetermined time unit.

8. An imaging apparatus for imaging a picture, comprising:
a solid-state imaging device capable of outputting an imaged signal by switching a standard screen rate and one or more screen rates different from the standard screen rate, at an arbitrary timing;
a moving picture encoding processing section encodes moving picture data obtained by imaging with the solid-state imaging device, to generate a moving picture stream;
a multiplexing processing section which multiplexes the moving picture stream and input time information which is information about an input time at which a predetermined picture frame of the moving picture stream is imaged by the solid-state imaging device, to generate a multiplexed stream;
a moving picture stream recording section which records the moving picture stream on a recording medium;
a timer section which counts a time;
a recording start time acquiring section which acquires a recording start time at the time a recording of the moving picture stream on the recording medium is requested, from the timer section;
a recording time information generating section which calculates the recording time information by integrating time information which is compliant with the screen rate of the moving picture stream to be inputted to the multiplexing processing section and which corresponds to a display interval for the picture frame, with regard to the recording start time;
a moving picture playback section which reads the multiplexed stream from the recording medium, to play back picture frames at the standard screen rate; and
a time information extracting section which extracts the recording time information from the multiplexed stream read from the recording medium in synchronism with the playback operation by the moving picture playback section,
in which the recording time information generating section includes (i) an integrator configured to receive a timing signal associated with a current respective screen rate which indicates a data processing timing and, to utilize the timing signal, to integrate a specific integrated value for the current respective screen rate with regard to the start time at the data processing timing to obtain an integrated value, and (ii) a converting section configured to convert the integrated value to the recording time information expressed in a predetermined time unit.

9. A moving picture data processing method for processing moving picture data, comprising the steps of:
causing a moving picture input section to receive an input of the moving picture data for which a standard screen rate and one or more screen rates different from the standard screen rate are switchable at an arbitrary timing;
causing an input start time acquiring section to acquire an input start time for the moving picture data at the moving picture input section, from a timer section;
causing an input time information generating section to calculate input time information by integrating time information which is compliant with the screen rate of the moving picture data to be inputted to a time information addition processing section and which corresponds to a display interval for a picture frame, with regard to the input start time;
causing the time information addition processing section to add the input time information calculated, to the moving picture data inputted to the moving picture input section;
causing a moving picture playback section to play back picture frames of the moving picture data to which the input time information is added, at the standard screen rate;

causing a time information extracting section to extract the input time information from the moving picture data in synchronism with the playback operation by the moving picture playback section; and causing a moving picture recording section to record the moving picture data to which the input time information is added on a recording medium, in which the input time information generating section includes (i) an integrator configured to receive a timing signal associated with a current respective screen rate which indicates a data processing timing for the respective picture frames and, to utilize the timing signal, to integrate a specific integrated value for the current respective screen rate with regard to the input start time at the data processing timing to obtain an integrated value, and (ii) a converting section configured to convert the integrated value to the input time information expressed in a predetermined time unit, and in which during operation the moving picture recording section records the moving picture data with the input time information in the predetermined time unit on the recording medium.

* * * * *